United States Patent [19]

Van de Weijer

[11] 4,098,565

[45] Jul. 4, 1978

[54] FLASHLAMP UNIT

[75] Inventor: Martinus Henricus Adrianus Van de Weijer, Eindhoven, Netherlands

[73] Assignee: U.S. Philips Corporation, New York, N.Y.

[21] Appl. No.: 586,516

[22] Filed: Jun. 12, 1975

[30] Foreign Application Priority Data

Jun. 17, 1974 [NL] Netherlands .................. 7408035

[51] Int. Cl.² ........................................... G03B 15/03
[52] U.S. Cl. ........................................ 431/93; 362/14
[58] Field of Search .............. 431/93, 92, 95 A, 95 R; 240/1.3

[56] References Cited

U.S. PATENT DOCUMENTS

| | | | |
|---|---|---|---|
| 2,408,469 | 10/1946 | Malloy | 431/93 X |
| 2,422,428 | 6/1947 | Magdsick | 431/93 X |
| 2,839,667 | 6/1958 | Cannella | 431/93 X |
| 2,985,748 | 5/1961 | Mendelsohn | 431/95 R X |
| 3,238,749 | 3/1966 | Reiber et al. | 431/95 R X |
| 3,783,260 | 1/1974 | Broadt | 431/93 X |
| 3,918,882 | 11/1975 | Van Der Laan | 431/93 X |

*Primary Examiner*—Gerald A. Michalsky
*Attorney, Agent, or Firm*—Frank R. Trifari; Robert S. Smith

[57] ABSTRACT

A flashlamp unit consisting of a module having a number of flashlamps carried on a disk shaped support, successive flashlamps are positioned proximate to a reflector as the support is indexed. The flashlamps are arranged radially on the support in such manner that the flashlamp unit has a thickness which is substantially equal to the largest transverse dimension of a flashlamp. The holder for the module includes positioning and indexing means for cooperation with the module.

6 Claims, 15 Drawing Figures

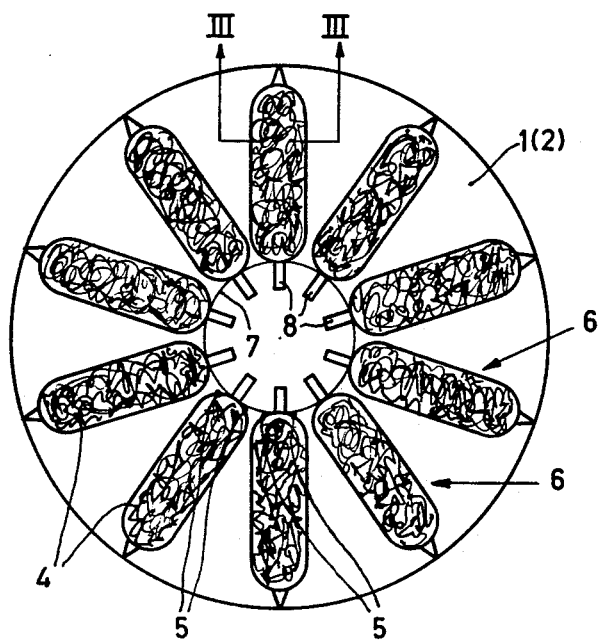
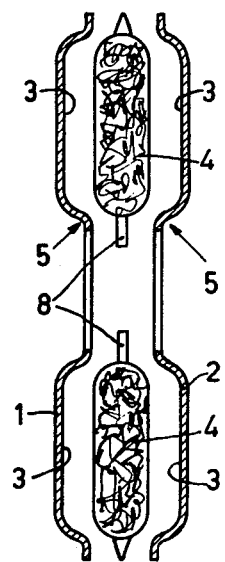
Fig.1  Fig.2
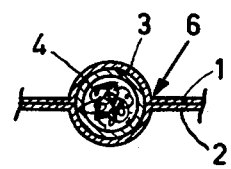
Fig.3
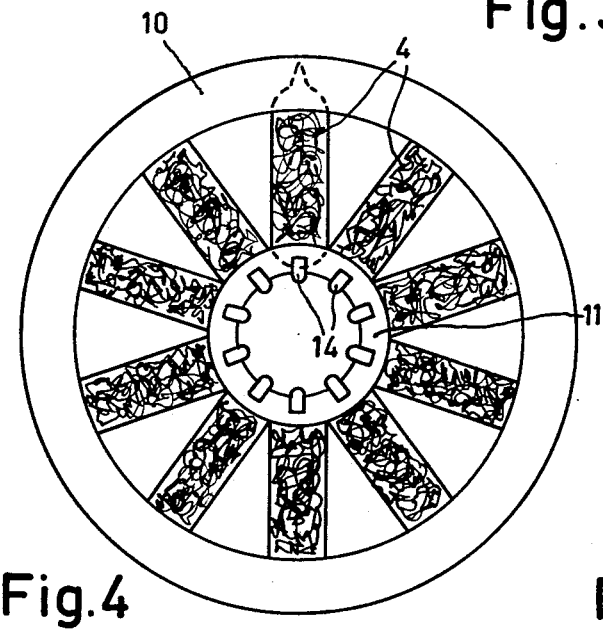
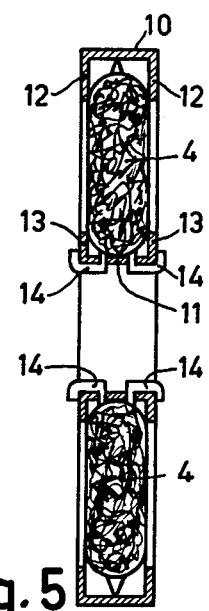
Fig.4  Fig.5

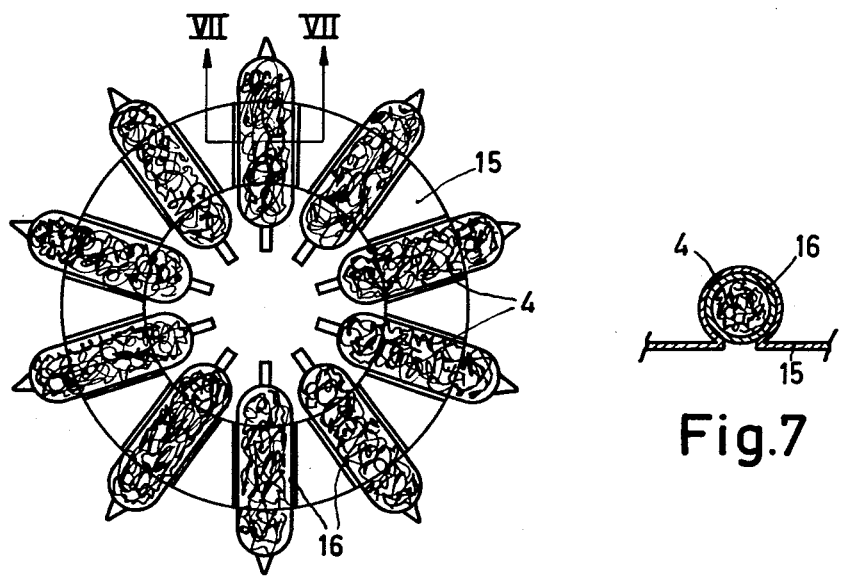
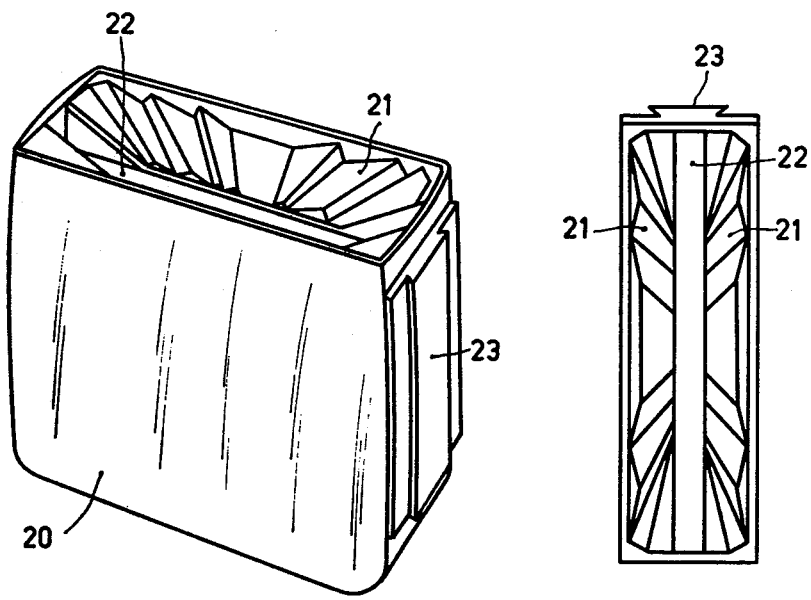

FLASHLAMP UNIT

The invention relates to a flashlamp unit comprising a number of flashlamps and a support in which the flashlamps are arranged in an ordered manner, which flashlamp unit is suitable for cooperation with a reflector by successively placing a flashlamp of the unit in the reflector and firing it.

For the successive use of a number of flashlamps it is known to use a flashcube or a flashpacket. In this case the flashlamps are arranged in a support in which each lamp has its own reflector. The result of this is that a bulky assembly is obtained with a comparatively restricted number of flashlamps. Furthermore, the construction is expensive and after utilisation the assembly is to be discarded.

It is also known to use subsequent delivery systems in which a single reflector is used and in which the flashlamps are successively arranged in the focus of the reflector. However, these systems require a complicated mechanism to supply the flashlamps successively to the reflector and to ignite them there. In order to be able to use as many flashlamps as is possible without subsequent delivery, the lamps are arranged quite close together. The flashlamp to be fired, however, must be maintained at a sufficiently large distance from the other ones. It will furthermore be desired that a fired lamp does not drop but is caught. For that purpose it will be necessary to combine the lamps mutually, for example, by means of a flexible tape. All this causes a difficult transport of the flashlamps to the reflector.

It is the object of the invention to provide a flashlamp unit which operates with only one reflector, in which nevertheless quite a number of flashlamps are incorporated in a small space, which lamps can be placed in the reflector in a simple and reliable manner and in which the price of the unit is low and the material to be discarded after use is small. The invention is based on the recognition of the fact that in order to reach said end in view the design and rigidity of the flashlamp unit are of great importance.

The invention is characterized in that the flashlamp unit is in the form of a disk in which the flashlamps are arranged in the support in such manner that the flashlamp unit has a thickness which is substantially equal to the largest transverse dimension of a flash lamp and the support freely passes the flashlight mainly on all sides, at least in a direction transverse to the length of the flashlamps, while the flashlamp unit has positioning and indexing means formed in the support and by the wall of the flashlamps, respectively, which means are suitable to cooperate with adapted positioning and indexing members in a holder for the flashlamp unit.

The flashlamp unit can advantageously be used in a flat flashlamp apparatus which has a slot-shaped recess for the unit in which the reflector is present at the mouth of the slot. Due to the radial arrangement quite a number of flashlamps can be incorporated in the flashlamp unit; since the flashlamps do not engage each other, sympathetic firing is prevented. The radial arrangement of the flashlamps further gives the unit a large rigidity so that both the positioning and the indexing in the flashlamp apparatus can be carried out in a simple and reliable manner. The reflector in which each flashlamp is successively arranged radially reflects mainly the laterally radiated light of the flashlamp; the free light passage on all sides of the support ensures a zonal luminous efficiency which is at least equal to that of a flashcube.

The flashlamp unit may be constructed in various manners, for example, as two walls which hold the flashlamps so as to be mutually oriented, as an outer ring and an inner ring between which the flashlamps are arranged like spokes, or by means of a support which is formed as an annular flat strip in which radially directed depressions for the flashlamps are provided.

In an embodiment which is considerably preferred the support consists of two transparent disks which have depressions at the area of the flashlamps and are united together with non-depressed parts. This results in a simple, cheap and favourably operating assembly. The support also forms a protection so that a protective lacquer on the flashlamps which is usual may be omitted, if desired.

The disks may have a central aperture in which firing means of the flashlamps extend in said aperture. Furthermore the disks may be coloured, dependent on the desired use.

The positioning means may advantageously be formed by the end portions of the envelope of the flashlamps directed towards the centre. The indexing means may be formed by the radially directed transition of the depressed part and the flat part of the support.

The invention furthermore relates to a flashlamp apparatus which is characterized in that it comprises a slot-like recess for receiving a flashlamp unit, a positioning member cooperating with the positioning means of the flashlamp unit mounting members to rotate the flashlamp unit through a desired angle, contacting members and a percussion mechanism, respectively, for the flashlamps, and a reflector in the focus of which each flashlamp can successively be placed. Such a flashlamp apparatus can be incorporated in a camera or it can be detachably connected to a camera by means of a connection member.

The invention furthermore relates to a camera in which the flashlamp apparatus according to the invention is incorporated, or is secured to the camera so as to be detachable, on a side remote from the lens. Since a sufficiently large distance is present between the lens and a flashlamp it is prevented that the eyes of a photographed person are displayed red in a colour photograph.

These and further characteristic features of the invention will be described in greater detail with reference to embodiments shown in the drawing.

FIGS. 1–3 show a first embodiment of a flashlamp unit.

FIGS. 4 and 5 show a second embodiment of the flashlamp unit.

FIGS. 6 and 7 show a further embodiment of the flashlamp unit.

FIGS. 8–10 show an example of a flashlamp apparatus to be used with the flashlamp unit according to the invention.

Figure 11:
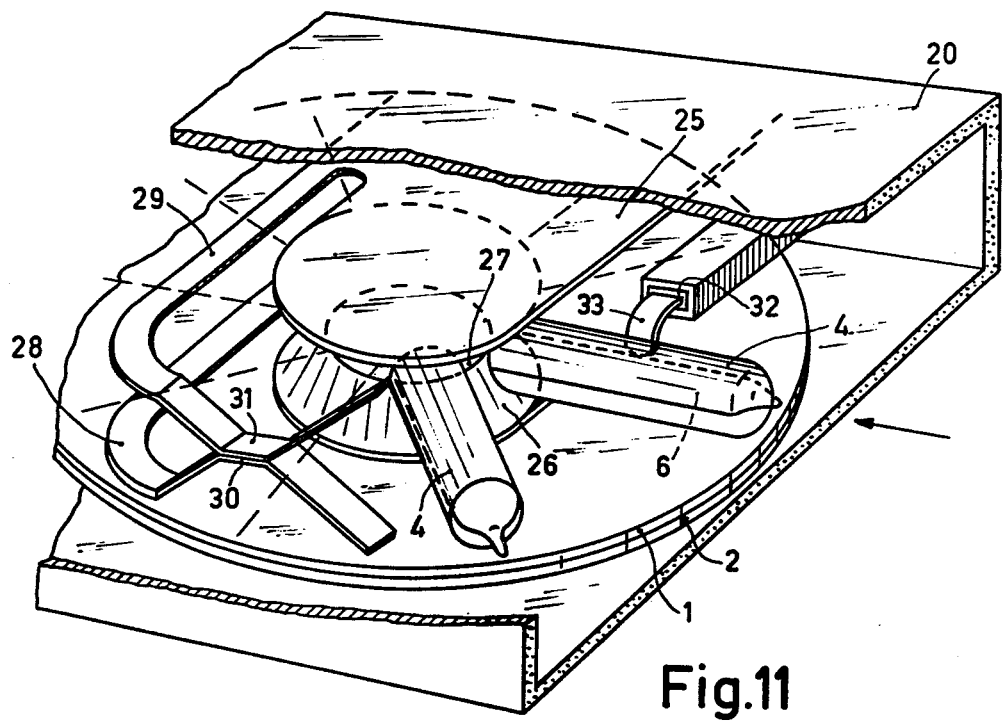
FIG. 11 shows diagrammatically the positioning and indexing members in the flashlamp apparatus.

FIGS. 1, 2 and 3 show a first embodiment of a flashlamp unit. The unit comprises two disks 1 and 2 having depressions 3. The disks 1 and 2 consist of a transparent material, preferably a transparent synthetic material. The depressions 3 are arranged in the longitudinal direction radially in the disks. Flashlamps 4 are provided in the depressions and the non-depressed parts of the disks are connected together, for example, by means of "sealing" or by means of a glue. In this manner a flashlamp unit is obtained, the construction of which is as flat as possible and forms a rigid assembly and in which the flashlamps 4 are arranged radially. Said radial arrangement has a number of attractive advantages. The ends of the flashlamps directed towards the centre can be arranged so as to be close together and the parts directed towards the circumference are sufficiently far remote from each other to enable flashing with a sufficient luminous efficiency. In this manner a rather large number of flashlamps can be incorporated in the unit. The flashlamps also contribute to the rigidity of the flashlamp unit. When the unit is placed in the flashlamp apparatus, the wall parts 5 directed towards the centre may serve as positioning means, said parts cooperating, for example, with two conical positioning members facing each other. The transition 6 of the flat part to the depressed parts of the disks 1, 2 may serve as a indexing means, in which, for example, a rod-shaped positioning member of the flashlamp apparatus can press against the transition so as to rotate the flashlamp unit over such a distance that a subsequent flashlamp is moved in the position for flashing. All this requires no special provisions of the flashlamp unit.

The disks 1,2 may comprise a central aperture 7. As shown in FIGS. 1 and 2, a ferrule 8 of the flashlamps projects in the aperture 7. The ferrule 8 is used in flashlamps with percussion firing. Such flashlamps are known per se. It is of course also possible to use flashlamps which are operated by means of battery ignition or piezo-electric ignition. In that case the flashlamp has two current wires which, for example, are each bent to a different side of the support near the central aperture 7.

The support may be given any desired colour, dependent on the desired field of application. The support furthermore forms a protective layer around the flashlamps. The result of this is that a protective lacquer on the flashlamps which is usual may be omitted, if desired.

It will be obvious that the invention is not restricted to the flashlamp unit as is shown in the drawing. For example, the support need not necessarily be circular but the outer circumference may, for example, be polygonal. The central aperture 7 is not necessary either. Furthermore, the positioning means may be constructed differently, for example, a positioning by means of the outer circumference of the support is possible. As a indexing means may furthermore be used notches in the support or thickenings provided on the support. If necessary, a screening plate may be present between the flashlamps so as to prevent sympathetic firing.

FIGS. 4 and 5 show a further embodiment of the flashlamp unit according to the invention. In this case the flashlamps are incorporated between an outer ring 10 and an inner ring 11. The assembly is in the form of a spoke wheel so that a flat construction of large rigidity is obtained. The rings may consist, for example, of cardboard, the outer ring having inwardly bent edges 12 and the inner ring having outwardly directed bent edges 13. This embodiment shows flashlamps having two current wires 14, so destined for battery ignition or piezo-electric ignition. One of the rings 10, 11 may serve as a positioning means in a flashlamp apparatus. As a indexing means may preferably serve notches (not shown) in the outer ring.

FIGS. 6 and 7 show a further embodiment of the flashlamp unit. It consists of an annular transparent flat strip 15 which has cavities 16 in which the flashlamps are held, for example, in a clamping manner or by means of a glue. The positioning and indexing in a flashlamp apparatus can be carried out in a manner as has been described with reference to the embodiment shown in FIGS. 1 to 3.

Figure 10:
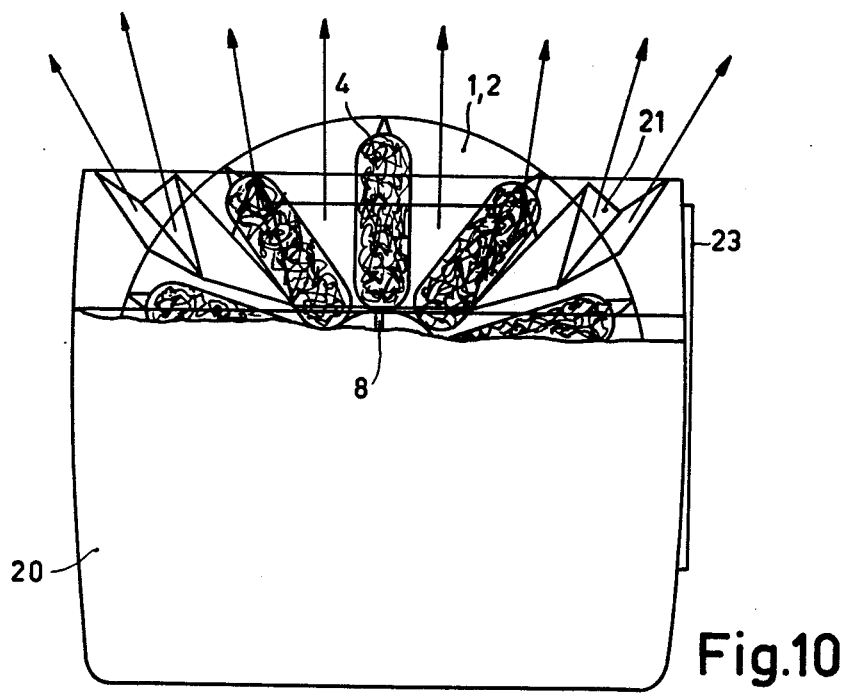

FIGS. 8 and 9 shown an embodiment of a flashlamp apparatus which is suitable for receiving the flashlamp unit described. The flashlamp apparatus comprises a housing 20 which is hollow and has a reflector 21 on one flat side. A slot-like recess 22 is present to introduce a flashlamp unit into the flashlamp apparatus. The reflector 21 which is shown to be facet-shaped extends on both sides of the slot-like recess 22. The housing 20 furthermore has a dovetail-like guide 23 for the connection to a matching connection member of a camera. FIG. 10 shows diagrammatically how the flashlamp unit is arranged in the flashlamp apparatus.

FIG. 11 shows elementarily the principle of a manner of positioning and indexing the flashlamp unit. The flashlamp apparatus has a positioning member 25 which comprises two facing truncated cones 26, 27. When the flashlamp unit is inserted into the slot-like aperture, the cones 26, 27 spring apart until the end parts 5 of the wall of the flashlamp 4 directed towards the centre of the flashlamp unit engage the conical surfaces 26, 27 after which the positioning has been effected. Two locking members 28, 29 each comprise a resilient lug 30, 31, which lugs become situated between two adjacent flashlamps and thus produce an unambiguous adjustment of the flashlamp unit. A indexing member shown diagrammatically has a rod 32 which can reciprocate in a guide and has a resilient lug 33. During the indexing movement the lug 33 engages the transition 6 (see FIG. 3) of the flat and the depressed part of the supporting disk of the flashlamp unit. The indexing movement of the rod 32 causes the flashlamp unit to rotate through such an angle that a fresh flashlamp is moved in the firing position.

Figures 12, 13:
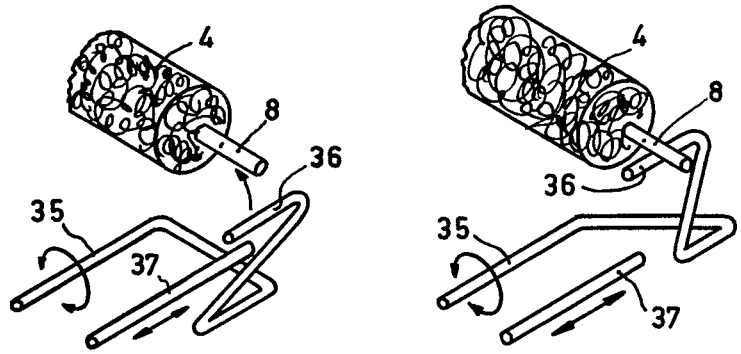
FIGS. 12 and 13 show diagrammatically the operation of a percussion spring for percussion firing.

FIGS. 12 and 13 show diagrammatically the operation of a percussion spring for firing a percussion flashlamp. The spring comprises a portion 35 which can be twisted in a part 36 which serves as a percussion member. A locking member 37 can hold the spring in the prestressed position (FIG. 12). When the locking member 37 is retracted, part 36 percusses against the ferrule 8, firing being effected. For flashlamps with battery ignition or piezo-electric ignition, the flashlamp apparatus will comprise contacting members not shown for the current supply wires of the flashlamps, which members are connected to the firing unit.

Figure 14:
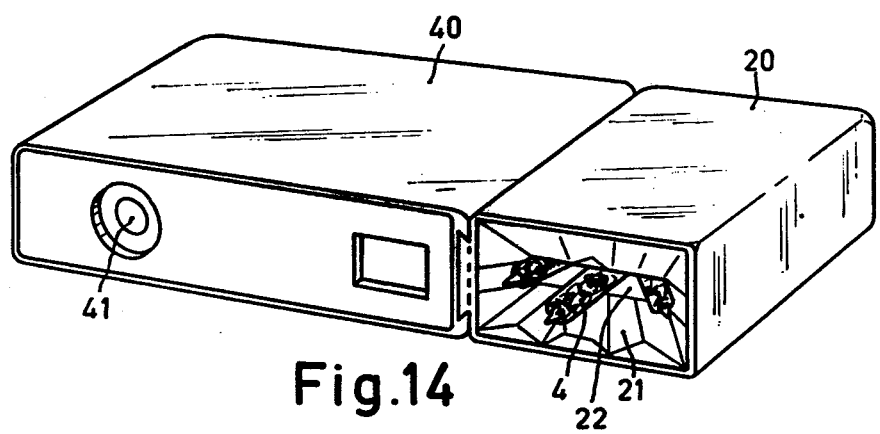
FIG. 14 shows a camera with the flashlamp apparatus connected detachably thereto and FIG. 15 shows a camera having the flashlamp apparatus incorporated.

FIG. 14 shows an arrangement of a flashlamp apparatus 20 which is secured to a camera 40 so as to be detachable. The flashlamp apparatus may comprise a dovetail-shaped connection member, the camera having a matching guide. The flashlamp apparatus is connected to the camera 40 on a side remote from the lens 41. Due to the comparatively large distance between the lens and the flashlamp it is prevented that the eyes of a photographed person show a red haze in the colour photograph.

Figure 15:
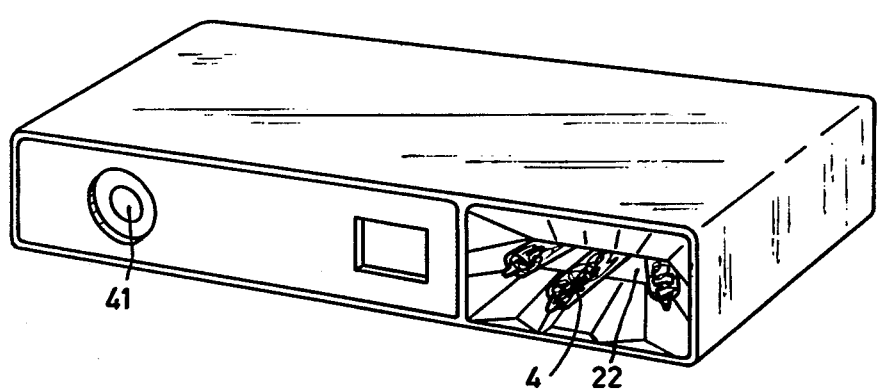

FIG. 15 shows a construction in which the flashlamp apparatus is incorporated in the camera.

What is claimed is:

1. A flashlamp unit for cooperating with an associated reflector having an elongated slot, the elongated slot having reflective surfaces on each elongated side disposed about a first plane and associated indexing means, said unit comprising: a module which includes a plurality of flashlamps each having a longitudinal axis and a support having a geometric center carrying said flashlamps arranged in fixed predetermined relationship to each other, said support including a first planar generally disk shaped member with each of said flashlamps carried thereon with the longitudinal axis thereof (a) in a second plane which is parallel and spaced from said disk and (b) in radial relation to the geometric center of said support, said member extending over at least half of each of said flashlamps to provide support and being translucent, said module having a thickness which is substantially equal to the largest transverse dimension of one of said flashlamps, said module including means for cooperating with the associated indexing means to selectively position one of said flashlamps proximate the associated reflector, said second plane and the first plane being generally coplanar when said module is cooperating with the reflector.

2. A flashlamp unit as claimed in claim 1 further including a second generally planar translucent member, said flashlamps being disposed intermediate said first and second members.

3. A flashlamp unit as claimed in claim 2, wherein each member has depressions cooperating with said flashlamps.

4. A flashlamp unit as claimed in claim 3 wherein said first member is colored.

5. A flashlamp unit as claimed in claim 3 wherein said means for cooperating include said depressions, said depressions extending radially.

6. A flashlamp unit as claimed in claim 1 wherein said first member is annular and has radially directed cavities for receiving said flashlamps.

* * * * *